United States Patent
Komori

(10) Patent No.: US 8,308,371 B2
(45) Date of Patent: Nov. 13, 2012

(54) BEARING APPARATUS FOR A WHEEL OF VEHICLE

(75) Inventor: Kazuo Komori, Iwata (JP)

(73) Assignee: NTN Corporation, Osaka (JP)

( * ) Notice: Subject to any disclaimer, the term of this patent is extended or adjusted under 35 U.S.C. 154(b) by 146 days.

(21) Appl. No.: 12/084,581

(22) PCT Filed: Nov. 7, 2006

(86) PCT No.: PCT/JP2006/322182
§ 371 (c)(1),
(2), (4) Date: May 6, 2008

(87) PCT Pub. No.: WO2007/052805
PCT Pub. Date: May 10, 2007

(65) Prior Publication Data
US 2009/0154857 A1    Jun. 18, 2009

(30) Foreign Application Priority Data

Nov. 7, 2005  (JP) .................................. 2005-322321
Nov. 10, 2005 (JP) .................................. 2005-326329

(51) Int. Cl.
*F16C 13/00* (2006.01)
(52) U.S. Cl. ..................................................... 384/544
(58) Field of Classification Search .................. 384/494, 384/537, 542, 543, 544, 548, 584, 585, 586, 384/589; 301/105.1
See application file for complete search history.

(56) References Cited

U.S. PATENT DOCUMENTS

| 5,727,886 | A | * | 3/1998 | Hata et al. ...................... 384/537 |
| 5,816,711 | A | * | 10/1998 | Gingrich ....................... 384/488 |
| 5,921,633 | A | | 7/1999 | Neibling et al. |
| 6,368,223 | B1 | * | 4/2002 | Ouchi et al. ................... 464/145 |
| 6,729,769 | B2 | * | 5/2004 | Sahashi et al. ................ 384/537 |
| 7,607,837 | B2 | * | 10/2009 | Niebling et al. .............. 384/544 |
| 2005/0018939 | A1 | | 1/2005 | Niwa et al. |
| 2005/0111771 | A1 | | 5/2005 | Shevket |

FOREIGN PATENT DOCUMENTS

| DE | 19506838 | | 8/1996 |
| EP | 1500524 | A2 | 1/2005 |
| JP | 2000-062405 | A | 2/2000 |
| JP | 2000-065049 | | 3/2000 |
| JP | 2001130211 | A * | 5/2001 |
| JP | 2002-347402 | | 12/2002 |
| JP | 2003-094905 | | 4/2003 |
| JP | 2003-254345 | | 9/2003 |

(Continued)

*Primary Examiner* — Phillip A Johnson
(74) *Attorney, Agent, or Firm* — Harness, Dickey & Pierce, P.L.C.

(57) ABSTRACT

A vehicle wheel bearing apparatus has an outer member (2), an inner member (1) and double row ball groups. A pitch circle diameter (PCDo) of the outer side ball group is larger than a pitch circle diameter (PCDi) of the inner side ball group. Ribs (17) are formed on a surface of the inner side of the wheel mounting flange (6). Each rib (17) is formed by an outline including straight portions (17a), radially extending outwardly from the base of the wheel mounting flange (6), and a rounded tip portion (17b), having a predetermined radius of curvature (r) centered on the axial center (O) of hub bolt (6a). The rounded tip substantially corresponds to a distance between the axial center (O) and the outermost periphery of the wheel mounting flange (6).

7 Claims, 4 Drawing Sheets

FOREIGN PATENT DOCUMENTS

| | | |
|---|---|---|
| JP | 2004-106618 | 4/2004 |
| JP | 2004-108449 A | 4/2004 |
| JP | 2004-314820 A | 11/2004 |
| JP | 2005-59831 A | 3/2005 |
| JP | 2005-291457 A | 10/2005 |
| JP | 2005-297885 A | 10/2005 |
| JP | 2005-308134 A | 11/2005 |
| WO | WO 2005058614 A1 * | 6/2005 |
| WO | WO-2005/065077 A2 | 7/2005 |

* cited by examiner

BEARING APPARATUS FOR A WHEEL OF VEHICLE

CROSS-REFERENCE TO RELATED APPLICATIONS

This application is a National Stage of International Application No. PCT/JP2006/322182, filed Nov. 7, 2006, which claims priority to JP 2005-322321, filed Nov. 7, 2005 and JP 2005-326329, filed Nov. 10, 2005. The disclosures of the above applications are incorporated herein by reference.

FIELD

The present disclosure relates to a bearing apparatus that freely rotatably supports a vehicle wheel and, more particularly, to a vehicle wheel bearing apparatus that reduces weight and increases the rigidity of the wheel bearing apparatus.

BACKGROUND

Vehicle wheel bearing apparatus is adapted to freely rotatably support a wheel hub to mount a wheel via a rolling bearing. An inner ring rotation type is used for driving wheels and both inner ring rotation and outer ring rotation types are used for driven wheels. Double row angular ball bearings are widely used in such a bearing apparatus since it has a desirable bearing rigidity, high durability against misalignment, and small rotation torque required for fuel consumption. On the contrary double row tapered roller bearings are widely used for off-road vehicles, trucks and heavy duty vehicles.

The vehicle wheel bearing apparatus is broadly classified into a first, second, third or fourth generation structure. A first generation structure includes a wheel bearing with a double row angular contact ball bearing fit between a knuckle, forming part of a suspension, and a wheel hub. The second generation structure includes a body mounting flange or a wheel mounting flange directly formed on the outer circumferential surface of an outer member. The third generation structure includes one of the inner raceway surfaces directly formed on the outer circumferential surface of the wheel hub. The fourth generation structure includes the inner raceway surfaces directly formed on the outer circumferential surfaces of the wheel hub and the constant velocity universal joint.

One example of a prior art wheel bearing apparatus is shown in FIG. 3. The vehicle wheel bearing apparatus 50 is formed by a double row tapered roller bearing having an outer member 51 integrally formed on its outer circumferential surface with a body mounting flange 51b. The flange 51b is to be mounted on a knuckle (not shown) of a vehicle. The outer member inner circumferential surface is formed with double row outer raceway surfaces 51a, 51a. An inner member is integrally formed on its outer circumferential surface with double row inner raceway surfaces 52a, 54a, opposite to the double row outer raceway surfaces 51a, 51a. Double row tapered rollers 56, 56 are freely rollably contained between the outer raceway surfaces 51a, 51a and inner raceway surfaces 52a, 54a. Cages 57, 57 freely rollably hold the double row tapered rollers 56, 56.

The inner member 55 includes a wheel hub 52 with a wheel mounting flange 53 integrally formed at one end. One inner raceway surface 52a is formed on the outer circumferential surface. A cylindrical portion 52b axially extends from the inner raceway surface 52a. An inner ring 54 is press fit onto the cylindrical portion 52b. The inner ring 54 is formed on its outer circumferential surface with the other inner raceway surface 54a. Thus, the inner member 55 forms the wheel bearing apparatus of the third generation structure for driving a driving wheel.

In addition, hub bolts 60 are adapted to be mounted on the wheel mounting flange 53 equidistantly along its outer periphery. Furthermore, seals 58, 59 are mounted in annular openings formed between the outer member 51 and the inner member 55. The seals prevent the leakage of grease contained within the bearing apparatus. Additionally, they prevent entry, from the outside, of rain water or dusts into the bearing apparatus.

In such a wheel bearing apparatus, radially extending ribs 61 are formed on a surface of the inner side of the wheel mounting flange 53. The ribs 62 are positioned at the hub bolts 60, as shown in FIG. 4, to increase the rigidity of the wheel bearing apparatus. Recesses 62, each having a substantially circular arc, are formed on the outermost periphery of the wheel mounting flange 53 between the hub bolts 60 to reduce the weight of the wheel bearing apparatus. On the other hand, the body mounting flange 51b of the outer member 51 is formed with apertures 63 for bolts fastened to a knuckle (not shown). The flange 51b is formed with recesses 64 each having a smoothly curved configuration on its outermost periphery between the bolt apertures 64. Each recess 64 is formed radially inward beyond the pitch circular diameter of the bolt apertures 63 in order to remove excessive material of the body mounting flange 51b (see Japanese Laid-open Patent Publication No. 65049/2000).

SUMMARY

In such a prior art wheel bearing apparatus 50, it is desirable to increase the rigidity of bearing apparatus in order to have sufficient strength and durability. This maintains stable driving even though a large moment load is applied to the bearing apparatus. However, since the space around a suspension is limited and thus the size of the bearing apparatus is also limited, it is very difficult to increase the rigidity of the bearing apparatus. In such a case, if additionally attempts are made to reduce the weight of the bearing apparatus, the difficulty to achieve both the increase of rigidity and the reduction of weight of the bearing apparatus becomes extremely difficult. This not only applies to the wheel hub 52, which requires strength and durability, but to the outer member 51, which requires it to fit within an inner diameter of a vehicle knuckle.

It is, therefore, an object of the present disclosure to provide a vehicle wheel bearing apparatus that can solve the antinomic problems of reducing the weight and increasing the rigidity of the bearing apparatus.

A vehicle wheel bearing apparatus comprises an outer member with double row outer raceway surfaces formed on its inner circumferential surface. An inner member includes a wheel hub with a wheel mounting flange integrally formed at one end. Hub bolts are adapted to be mounted on the wheel mounting flange equidistantly along its outer periphery. One inner raceway surface is formed on the outer circumferential surface of the inner member. The inner raceway surface is opposite to one of the double row outer raceway surfaces. A cylindrical portion axially extends from the inner raceway surface. An inner ring is press fit onto the cylindrical portion. The inner ring is formed with the other inner raceway surface on its outer circumferential surface. The other inner raceway surface is opposite to the other raceway surface of the double row outer raceway surfaces. Double row groups of balls are freely rollably contained between the outer raceway surfaces and inner raceway surfaces, respectively, of the outer member and the inner members. A pitch circle diameter of the outer side ball group is larger than a pitch circle diameter of the inner side ball group. Ribs are formed on a surface of the inner side of the wheel mounting flange. Each rib is formed by an outline including straight portions radially extending from the base of the wheel mounting flange. A rounded tip portion with a predetermined radius of curvature is centered on the axial center of the hub bolt. The rounded tip portion substantially corresponds to a distance between the axial center and the outermost periphery of the wheel mounting flange.

In the wheel bearing apparatus of the first through fourth generations, the pitch circle diameter of the outer side ball group is larger than the pitch circle diameter of the inner side ball group. The ribs are formed on a surface of the inner side of the wheel mounting flange. Each rib is formed by an outline including straight portions radially extending from the base of the wheel mounting flange. A rounded tip portion has a predetermined radius of curvature centered on the axial center of a hub bolt. The rounded tip portion substantially corresponds to a distance between the axial center and the outermost periphery of the wheel mounting flange. Accordingly, it is possible to provide a vehicle wheel bearing apparatus that solves the antinomic problems of reducing the weight and increasing the rigidity of the bearing apparatus.

The radius of curvature "r" of the rounded tip portion is set so that it is larger than a distance "a" between the axial center of the hub bolt and the straight portion and smaller than a distance "b" between the axial center of the hub bolt and a point of intersection of the outermost periphery of the wheel mounting flange and a line extended radially outward from the straight portion. Accordingly, the relationship (a≦r<b) exists.

A vehicle wheel bearing apparatus comprises: an outer member formed with a body mounting flange on its outer circumferential surface. The body flange is adapted to be mounted on an automobile knuckle. The outer member is also formed with double row outer raceway surfaces on its inner circumferential surface. An inner member is formed with double row inner raceway surfaces on its outer circumferential surface. The double row inner raceway surfaces, respectively, are opposite to the other raceway surface. Double row groups of balls are freely rollably contained between the outer raceway surfaces and inner raceway surfaces, respectively, of the outer member and the inner members. The body mounting flange is formed with four apertures for bolts fastened to a knuckle. Also, it is formed with recesses each having a smoothly curved configuration on its outermost periphery between the bolt apertures. A pitch circle diameter of the outer side ball group is larger than a pitch circle diameter of the inner side ball group. The pitch "Y" of the bolt apertures in a loading direction is larger than the pitch "X" of bolt apertures in a direction orthogonal to the loading direction (i.e. X≦Y).

The vehicle wheel bearing apparatus has an outer member formed on its outer circumferential surface with a body mounting flange adapted to be mounted on an automobile knuckle. The body mounting flange is formed with four apertures for bolts fastened to a knuckle. The pitch circle diameter of the outer side ball group is larger than the pitch circle diameter of the inner side ball group. The pitch "Y" of bolt apertures in a loading direction is larger than the pitch "X" of bolt apertures in a direction orthogonal to the loading direction (i.e. X≦Y). Thus, it is possible to provide a vehicle wheel bearing apparatus that can solve the antinomic problems of reducing weight and increasing rigidity of the bearing apparatus.

It is preferable that the outer diameter of each ball is same in the ball groups, and the number of balls of the outer side ball group is set larger than that of balls of the inner side ball group. This satisfies both the increase of rigidity and extension of bearing life.

The ratio "d/PCDi" of the outer diameter "d" of each ball to the pitch circle diameter "PCDi" of the inner side ball group is set in a range of 0.14≦(d/PCDi)≦0.25. This satisfies both the increase of rigidity and extension of bearing life.

The inner member includes a wheel hub with a wheel mounting flange integrally formed at one end. One inner raceway surface is formed on the outer circumferential surface opposite to one of the double row outer raceway surfaces. A cylindrical portion axially extends from the inner raceway surface. An inner ring is press fit onto the cylindrical portion. The inner ring is formed with the other inner raceway surface on its outer circumferential surface opposite to the other raceway surface of the double row outer raceway surfaces. A substantially conical recess is formed in an outer side end portion of the wheel hub. The depth of the recess extends so that a substantially constant wall thickness is formed between the conical recess and the outer circumferential surface of the wheel hub of the outer side end portion. This makes it possible to provide a vehicle wheel bearing apparatus that can solve the antinomic problems of reducing weight and increasing rigidity of the bearing apparatus.

According to the vehicle wheel bearing apparatus, it comprises an outer member formed with double row outer raceway surfaces on its inner circumferential surface. An inner member includes a wheel hub with a wheel mounting flange integrally formed at one end. Hub bolts are adapted to be mounted on the wheel mounting flange equidistantly along its outer periphery. One inner raceway surface formed on the outer circumferential surface is opposite to one of the double row outer raceway surfaces. A cylindrical portion axially extends from the inner raceway surface. An inner ring is press fit onto the cylindrical portion. The inner ring is formed with the other inner raceway surface on its outer circumferential surface opposite to the other raceway surface of the double row outer raceway surfaces. Double row groups of balls are freely rollably contained between the outer raceway surfaces and inner raceway surfaces, respectively, of the outer member and the inner members. A pitch circle diameter of the outer side ball group is larger than a pitch circle diameter of the inner side ball group. Ribs are formed on a surface of the inner side of the wheel mounting flange. Each rib is formed by an outline including straight portions radially extending from the base of the wheel mounting flange. A rounded tip portion has a predetermined radius of curvature centered on the axial center of the hub bolt. The rounded tip portion substantially corresponds to a distance between the axial center and the outermost periphery of the wheel mounting flange. Thus, it is possible to provide a vehicle wheel bearing apparatus that can solve the antinomic problems of reducing weight and increasing the rigidity of the bearing apparatus.

The vehicle wheel bearing apparatus comprises an outer member formed with a body mounting flange on its outer circumferential surface. The body mounting flange is adapted to be mounted on an automobile knuckle. Also formed on the outer member inner circumferential surface are double row outer raceway surfaces. An inner member is formed with double row inner raceway surfaces on its outer circumferential surface opposite to the other raceway surface. Double row groups of balls are freely rollably contained between the outer raceway surfaces and inner raceway surfaces, respectively, of the outer member and the inner members. The body mounting flange is formed with four apertures for bolts fastened to a knuckle. Also, the flange is formed with recesses. Each recess has a smoothly curved configuration on its outermost periphery between the bolt apertures. A pitch circle diameter of the outer side ball group is larger than a pitch circle diameter of the inner side ball group. The pitch "Y" of bolt apertures in a loading direction is larger than the pitch "X" of bolt apertures in a direction orthogonal to the loading direction (i.e. X≦Y). Thus, it is possible to provide a vehicle wheel bearing apparatus that can solve the antinomic problems of reducing weight and increasing the rigidity of the bearing apparatus.

A vehicle wheel bearing apparatus comprises an outer member formed with a body mounting flange on its outer circumferential surface. The flange is adapted to be mounted on an automobile knuckle. The outer member is also formed with double row outer raceway surfaces on its inner circumferential surface. An inner member includes a wheel hub with a wheel mounting flange integrally formed at one end. One inner raceway surface is formed on the outer circumferential surface opposite to one of the double row outer raceway surfaces. A cylindrical portion axially extends from the inner raceway surface. An inner ring is press fit onto the cylindrical portion. The inner ring is formed with the other inner raceway surface on its outer circumferential surface opposite to the other raceway surface of the double row outer raceway surfaces. Double row groups of balls are freely rollably contained between the outer raceway surfaces and inner raceway surfaces, respectively, of the outer member and the inner members. The body mounting flange is formed with four apertures for bolts fastened to a knuckle. The flange is formed with recesses. Each recess has a smoothly curved configuration on its outermost periphery between the bolt apertures. A pitch circle diameter of the outer side ball group is larger than a pitch circle diameter of the inner side ball group. The outer diameter of each ball is the same in the ball groups. The number of balls of the outer side ball group is set larger than the number of balls of the inner side ball group. Ribs are formed on a surface of the inner side of the wheel mounting flange. Each rib is formed by an outline including straight portions radially extending from the base of the wheel mounting flange and a rounded tip portion. The pitch "Y" of bolt apertures in a loading direction is equal to the pitch "X" of bolt apertures in a direction orthogonal to the loading direction.

DRAWINGS

Additional advantages and features of the present disclosure will become apparent from the subsequent description and the appended claims, taken in conjunction with the accompanying drawings, wherein:

DETAILED DESCRIPTION

A preferable embodiment will be hereinafter described with reference to the drawings.

Figure 1:
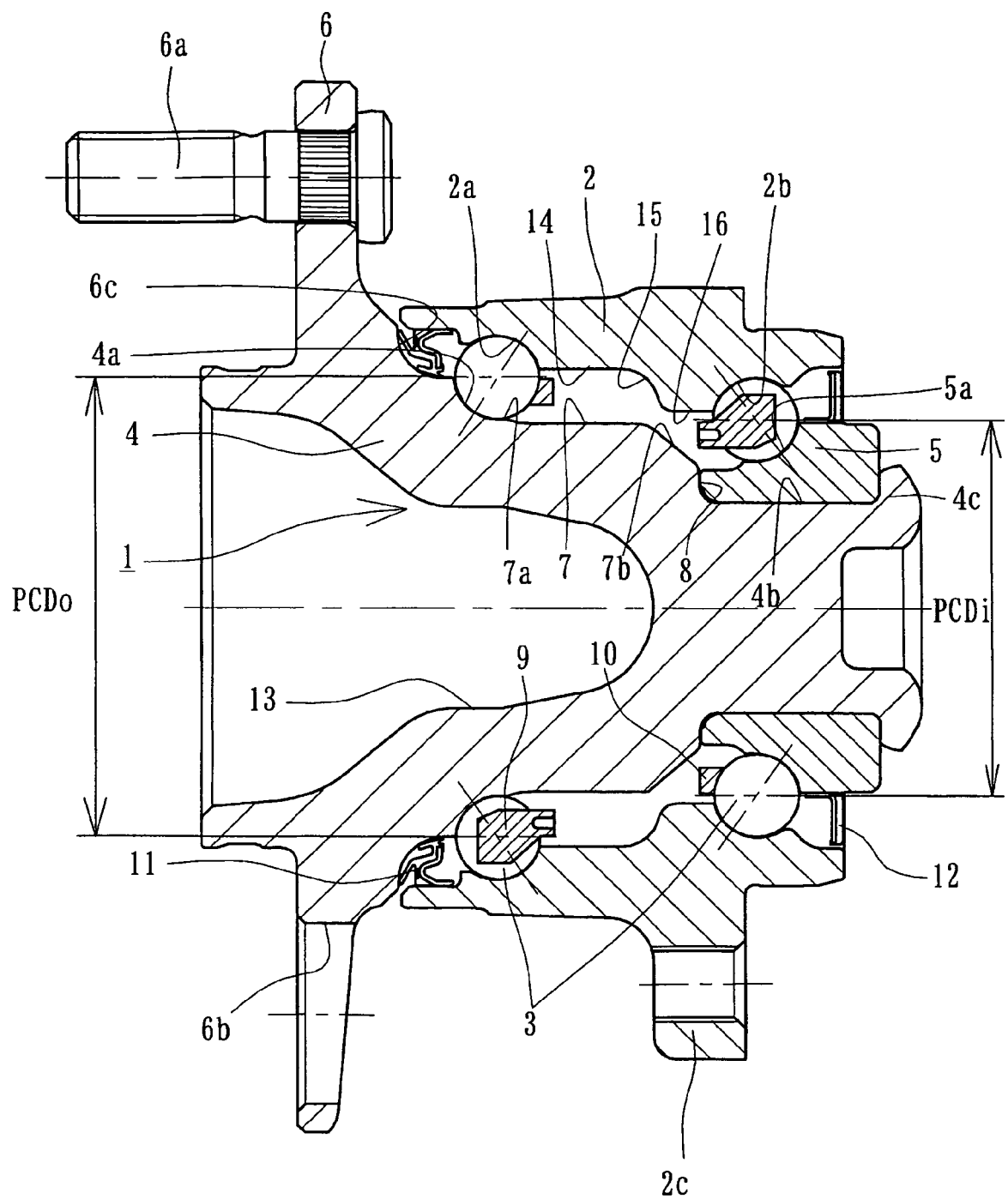
FIG. 1 is a longitudinal section view of a vehicle wheel bearing apparatus.
Figure 2:
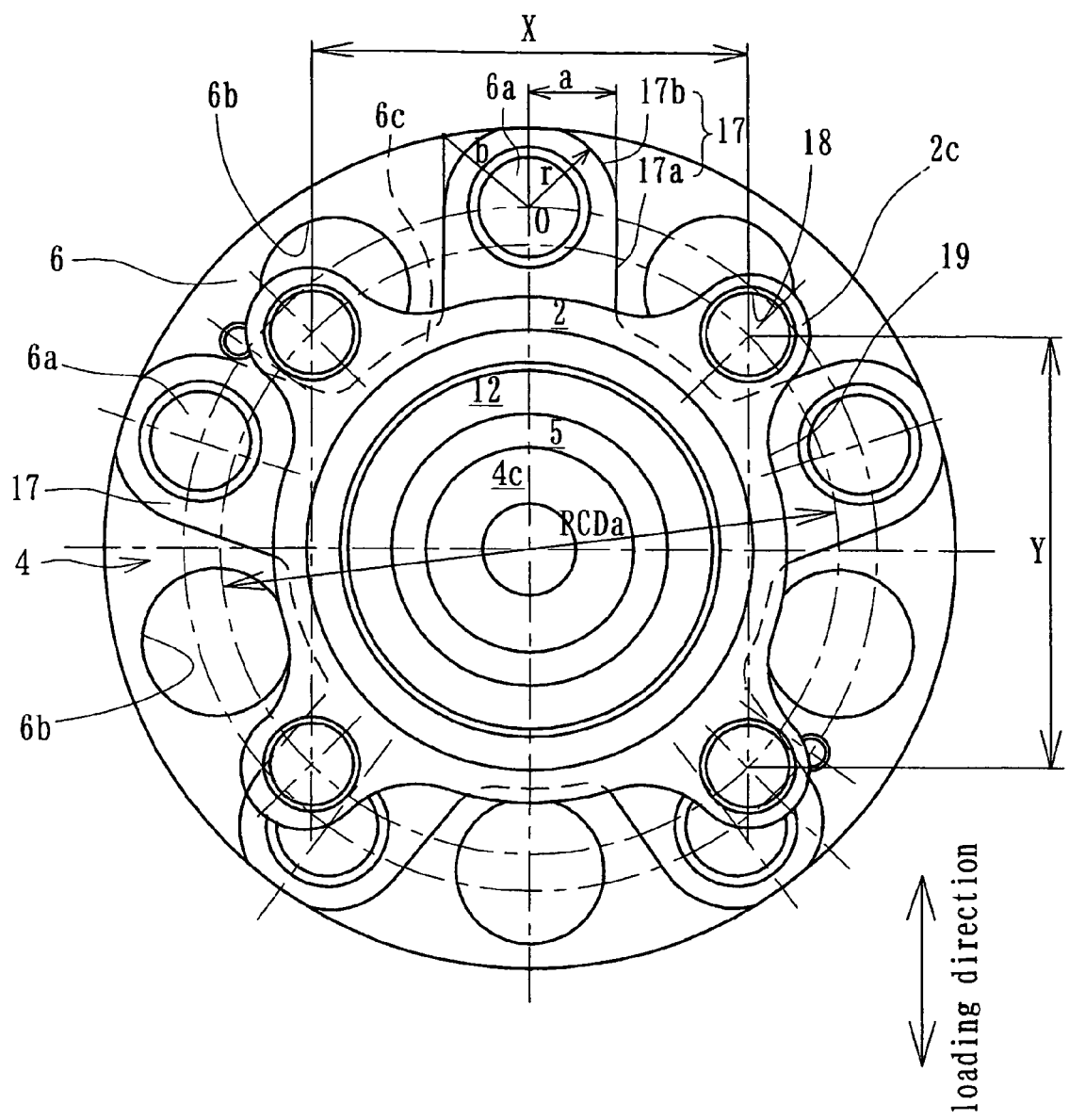
FIG. 2 is a side elevation view of FIG. 1.
Figure 3:
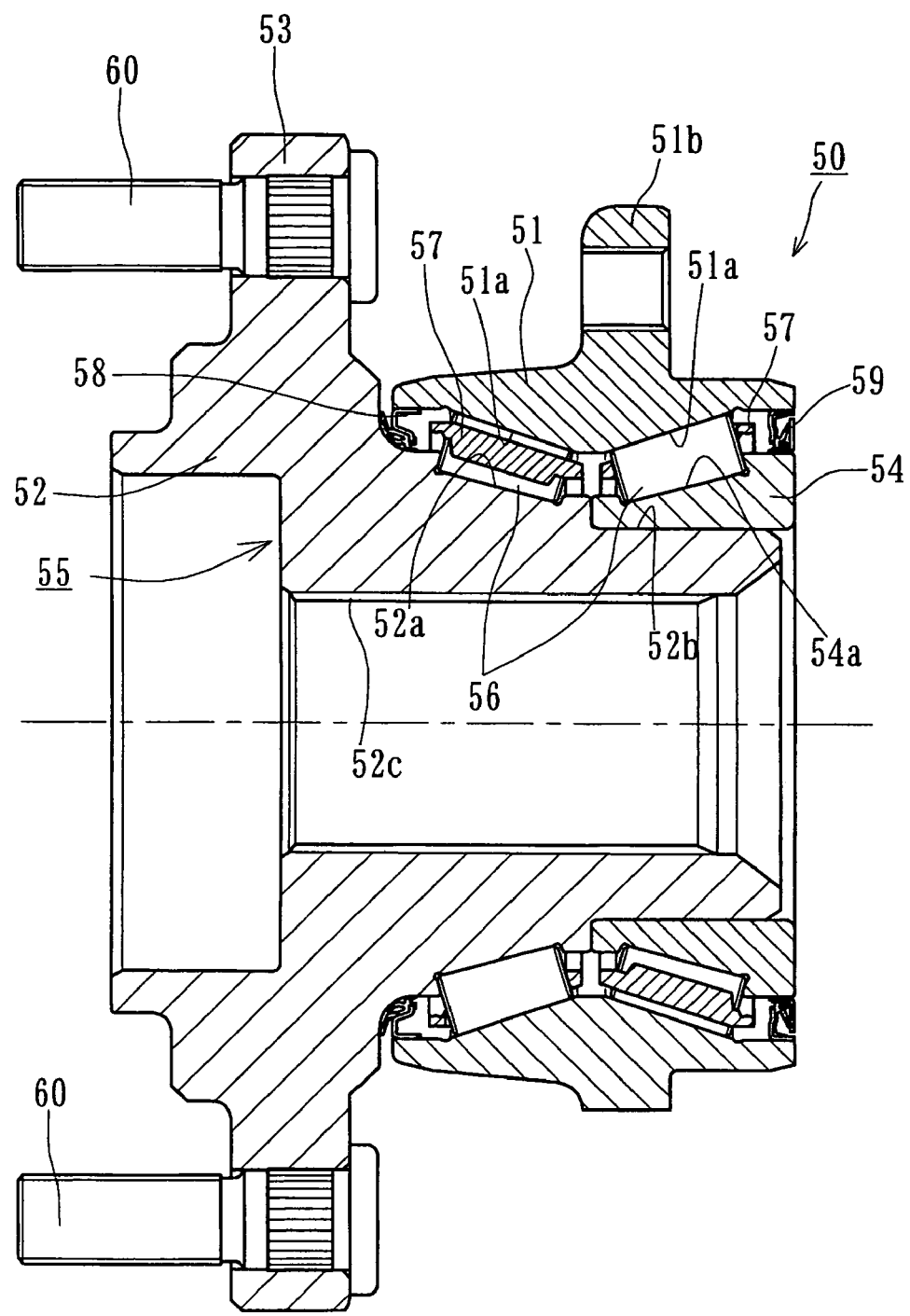
FIG. 3 is a longitudinal section view of a prior art vehicle wheel bearing apparatus.
Figure 4:
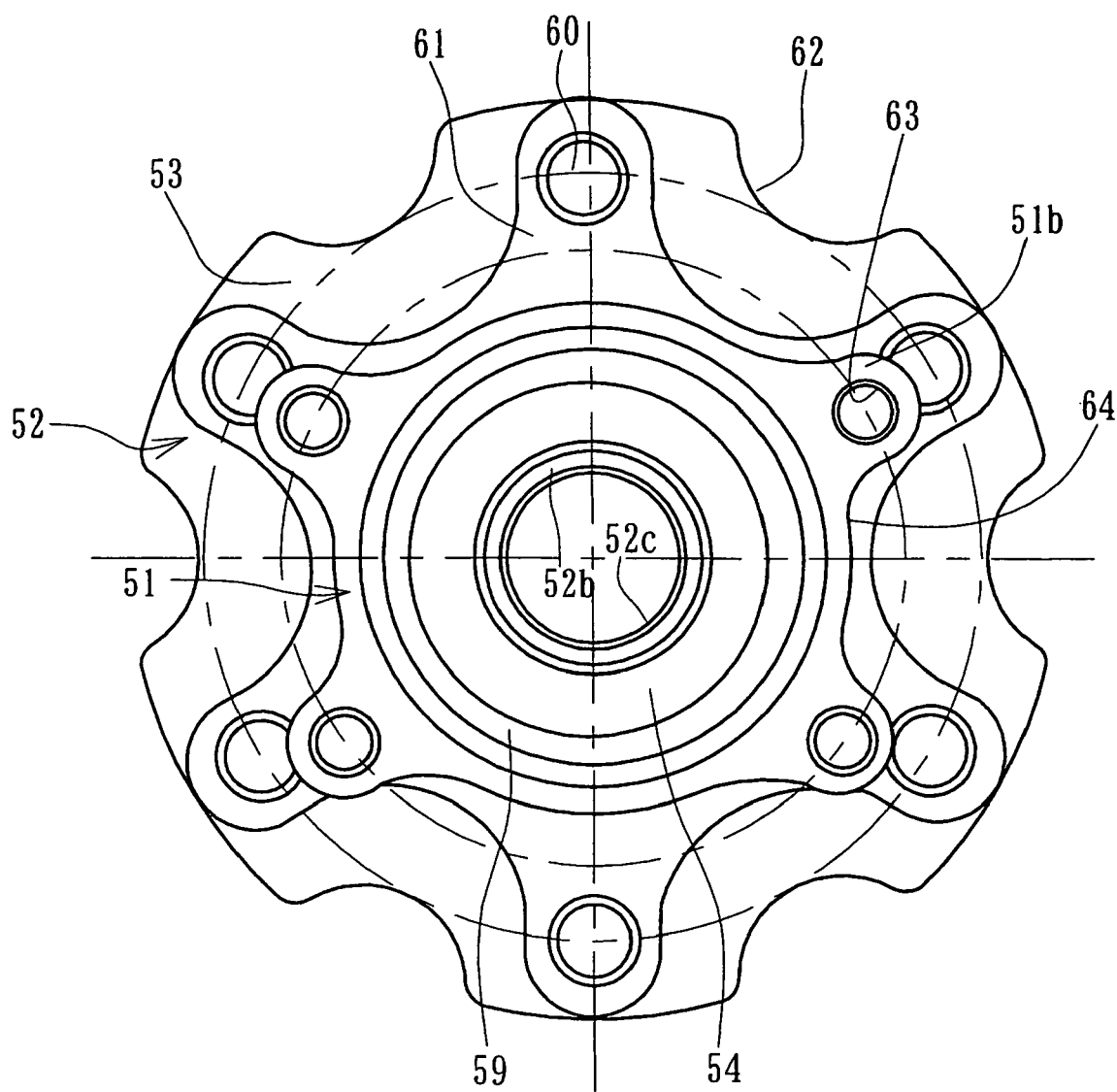
FIG. 4 is a side elevation view of FIG. 3.

FIG. 1 is a longitudinal section view of the vehicle wheel bearing apparatus. FIG. 2 is a side elevation view of FIG. 1. In the below description, the term "outer side" (left hand side in the drawings) of the apparatus denotes a side that is positioned outside of the vehicle body. The term "inner side" (right hand side in the drawings) of the apparatus denotes a side that is positioned inside of the body when the bearing apparatus is mounted on the vehicle body.

The vehicle wheel bearing apparatus shown in FIG. 1 is a third generation type used for a driven wheel. The bearing apparatus has an inner member 1, an outer member 2, and double rows of balls (ball groups) 3, 3 rollably contained between the inner and outer members 1, 2. The inner member 1 has a wheel hub 4. An inner ring 5 is press fit onto the wheel hub with a predetermined interference. The wheel hub 4 is integrally formed with a wheel mounting flange 6 at one end. One (outer side) inner raceway surface 4a is formed on the outer circumferential surface. A cylindrical portion 4b extends from the inner raceway surface 4a through a shaft shaped portion 7. Hub bolts 6a are arranged on the wheel mounting flange 6 equidistantly along the periphery of the wheel mounting flange 6. Circular apertures 6b are formed between the hub bolts 6a. These circular apertures 6b contribute not only to weight reduction weight of the bearing apparatus but to passage of any fastening tool used to assemble and disassemble of the bearing apparatus.

The inner ring 5 is formed with the outer (inner side) inner raceway surface 5a on its outer circumferential surface. The inner ring 5 is adapted to be press fit onto the cylindrical portion 4b of the wheel hub 4 with a predetermined interference. The inner ring 5 is axially secured by a caulked portion 4c plastically deformed at the end of the cylindrical portion 4b. The inner ring 5 is made of high carbon chrome bearing steel, such as SUJ 2, and is hardened to its core by dip quenching to have a hardness of 58~64 HRC.

The wheel hub 4 is made of medium carbon steel including carbon of 0.40~0.80% by weight, such as S53C, and is hardened by high frequency induction quenching. A region, including the inner raceway surface 4a from the inner side base 6c of the wheel mounting flange 6 to the cylindrical portion 4b, has a surface hardness of 58~64 HRC. The caulked portion 4c surface hardness remains as is after forging. Accordingly, the wheel mounting flange 6 has a sufficient mechanical strength against rotary bending loads applied to it. The anti-fretting strength of the cylindrical portion 4b, at a region press fit by the inner ring 5, can be improved. The plastic deforming working of the caulked portion 4c can be also carried out without any micro crack during the caulking process.

The outer member 2 is integrally formed on its outer circumferential surface with a body mounting flange 2c. The flange 2c is to be mounted on a vehicle knuckle (not shown). The outer member 2, on its inner circumferential surface, has an outer side outer raceway surface 2a opposite to the inner raceway surface 4a of the wheel hub 4. Also, it includes an inner side outer raceway surface 2b opposite to the inner raceway surface 5a of the inner ring 5. Double rows of balls 3, 3 are contained between these outer and inner raceway surfaces. The balls 3, 3 are rollably held by cages 9, 10. The outer member 2 is made of medium carbon steel including carbon of 0.40~0.80% by weight, such as S53C. The double row outer raceway surfaces 2a, 2b are hardened by high frequency induction quenching to have a surface hardness of 58~64 HRC.

A seal 11 is mounted within an annular space of an outer side end portion formed between the outer member 2 and the inner member 1. A magnetic encoder 12 is mounted within the annular space of an inner side end for detecting the rotational speed of wheel. The seal 11 and a cap (not shown) cover the opened end of the outer member 2 to prevent the leakage of grease contained in the bearing. Additionally, they prevent the entry of rain water and dusts into the bearing from the outside. Although the structure shown here is that of a third generation bearing, the bearing apparatus of the present disclosure can be applied to the bearing structure of the second and fourth generation if the bearing apparatus is an inner ring rotation type in which the body mounting flange 2c is integrally formed on the outer circumferential surface of the outer member 2. In addition although the illustrated bearing apparatus uses the double row angular ball bearing, it is possible to use other bearing e.g. a double row tapered roller bearing with tapered rollers as the rolling elements.

As shown in FIG. 1 a pitch circle diameter PCDo of the outer side ball group 3 is set larger than a pitch circle diameter PCDi of the inner side ball group 3 (PCDo>PCDi). The diameter "d" of each ball 3 is the same in both the outer and inner sides. Thus, the number of balls in the outer side ball group 3 is larger than of the number of balls in the inner side ball group 3 due to the fact that PCDo>PCDi.

The outer outline configuration of the wheel hub 4 continues from the bottom of the inner raceway surface 4a to the cylindrical portion 4b, via the counter portion 7a, the shaft shaped portion 7, axially extending from the counter portion 7a, a taper shaped stepped portion 7b, and the shoulder 8 which abuts the inner ring 5. A substantially conical recess 13 is formed at the outer side end portion of the wheel hub 4. The depth of the recess 13 extends to near the stepped portion 7b of the shaft shaped portion 7 beyond the bottom of the inner raceway surface 4a. Thus, the wall thickness of the wheel hub 4 at the outer side, i.e., the wall thickness between the conical recess 13 and the outer circumferential surface of the wheel hub 4 at the outer side, is substantially constant. In addition, due to the fact that PCDo>PCDi, the diameter of the inner raceway surface 4a is larger than the inner raceway surface 5a of the inner ring 5. Thus, the outer diameter of the shaft shaped portion 7 is larger than the diameter of the bottom of the inner raceway surface 5a.

In the outer member 2, due to the fact that PCDo>PCDi, the diameter of the outer side outer raceway surface 2a is larger than the inner side outer raceway surface 2b. The outer side outer raceway surface 2a continues to the inner side outer raceway surface 2b via a cylindrical shoulder 14, a stepped portion 15 and a cylindrical shoulder portion 16 of a smaller diameter. The inner diameter of the bottom of the outer raceway surface 2b is set so that it has substantially the same diameter as the inner diameter of the shoulder 14 of larger diameter.

In the vehicle wheel bearing apparatus having such a structure, since the pitch circle diameter PCDo of the outer side ball group 3 is larger than the pitch circle diameter PCDi of the inner side ball group 3 and the number balls of the outer side ball group 3 is also larger than the number of balls of the inner side ball group 3, the bearing rigidity of the bearing apparatus at the outer side can be increased. Thus, the life of the bearing apparatus can be extended. In addition, since the recess 13 is formed at the outer side end portion of the wheel hub 4 so that the wall thickness of the wheel hub 4 at the outer side end portion is substantially constant, it is possible to substantially reduce the weight of the bearing apparatus. Accordingly, this solves the antinomic problems of reducing weight of the bearing apparatus and increasing the rigidity of the bearing apparatus.

In addition, according to this embodiment a ratio of the diameter "d" of each ball 3 to the pitch circle diameter PCDi of the inner side ball group 3 (d/PCDi) is set in a predetermined range of 0.14≦(d/PCDi)≦0.25. This increases the bearing rigidity at the outer side. In view of the bearing rigidity, a smaller diameter "d" of each ball 3 is preferable since a larger number of balls 3 (i.e., a smaller diameter "d") can increase the bearing rigidity in the same pitch circle diameter PCDi. However in view of the life of the bearing apparatus, a larger diameter "d" of ball 3 is preferable since the larger diameter "d" of ball 3 reduces the rolling fatigue strength.

As a result of an FEM analysis (analysis using an electrolytic electron microscope) of the relationship between the pitch circle diameter PCDi and the diameter "d" of ball 3, it has been found that the bearing rigidity cannot be increased when d/PCDi exceeds 0.25. Also, the rolling fatigue strength is lowered when d/PCDi is less than 0.14. Accordingly, it is possible to satisfy both the increased rigidity and extension of the bearing life by setting the ratio d/PCDi in the range 0.14≦(d/PCDi)≦0.25 in addition to setting the pitch circle diameter PCDo of the outer side ball group 3 larger than the pitch circle diameter PCDi of the inner side ball group 3.

Ribs 17 are formed on the wheel mounting flange 6 of the wheel hub 4 in order to increase the rigidity of the bearing apparatus. Circular apertures 6b are also formed in the wheel mounting flange 6 in order to reduce the weight of the bearing apparatus as shown in FIG. 2. Each rib 17 is formed on the inner side surface of the wheel mounting flange 6 at a position where the hub bolt 6a is press fit. The ribs have a configuration radially extending outward from the base 6c of the wheel mounting flange 6. Each rib 17 is formed by an outline comprising straight portions 17a radially extending outward from the base of the wheel mounting flange 6 and a rounded tip portion 17b. The ribs 17 increase the strength and thus rigidity of the wheel mounting flange 6. This enables the circular apertures 6b to be formed with a larger diameter to further reduce the weight of the bearing apparatus.

The rounded tip portion 17b is formed with a circular arc of a radius of curvature "r" centered on the axial center "O" of hub bolt 6a. The radius of curvature "r" substantially corresponds to a distance between the axial center "O" of the hub bolt 6a and the outermost periphery of the wheel mounting flange 6. That is, the radius of curvature "r" of the rounded tip portion 17b is set so that it is larger than a distance "a" between the axial center "O" of hub bolt 6a and the straight portion 17a and smaller than a distance "b" between the axial center "O" of hub bolt 6a and a point of intersection of the outermost periphery of the wheel mounting flange 6 and a line extended radially outward from the straight portion 17a (i.e. a≦r<b).

The body mounting flange 2c of the outer member 2 is formed with apertures 18 to receive bolts to fasten to the vehicle knuckle (not shown). Recesses 19, formed on the flange 2c, each have a smoothly curved configuration on the outermost periphery of the body mounting flange 2c between the bolt apertures 18. Each recess 19 is formed to extend radially inward beyond the pitch circular diameter of the bolt apertures 18 in order to remove excessive material of the body mounting flange 2c. This contributes to further weight reduction of the wheel bearing apparatus.

Arrangement of the bolt apertures 18 of the body mounting flange 2c in a four-aperture type increases the rigidity of the outer member 2. In this case, it is preferable to set the pitch of the bolt apertures 18 so that the pitch "Y" of bolt apertures 18 in a loading direction is larger than the pitch "X" of bolt apertures 18 in a direction orthogonal to the loading direction and, more preferably, "X" equals to "Y" (i.e. X≦Y). This enables an increase in the rigidity of the outer member 2 even when the design of the knuckle is changed.

According to the FEM analysis carried out by the applicant, a 33~37% increase in the rigidity of the outer member 2 alone is observed in the outer member 2 when X=Y=70~80 mm and X/Y=1.0 as compared with a conventional outer member having specifications X=80~90 mm and X/Y=1.6~1.8. It has also been found that a 16~18% increase of the rigidity is additionary achieved not only in the wheel hub 4 but in the bearing unit where the inner member 1 has been incorporated. Accordingly, it has been found that it is possible to provide a vehicle wheel bearing apparatus that can solve the antinomic problems of reducing weight and increasing the rigidity of the bearing apparatus by setting the relation between the pitch "X" and "Y" of bolt apertures 18 as X≦Y.

If the pitches "X" and "Y" of the bolt apertures 18 of the outer member 2 are set equal (X=Y), the outer member 2 can be assembled to the knuckle of vehicle without considering the orientation of the body mounting flange 2c of the outer member. Thus, the workability of assembly can be improved.

The vehicle wheel bearing apparatus can be applied to any of the bearing apparatus of the second~fourth generations, irrespective of its application for a driving wheel or a driven wheel.

The present disclosure has been described with reference to a preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A bearing apparatus comprising:
   an outer member formed with double row outer raceway surfaces on its inner circumferential surface;
   an inner member including a wheel hub with a disk shaped wheel mounting flange integrally formed at one end continuously about a periphery of the inner member, a first plurality of apertures and a second plurality of circular apertures formed in the flange, the second plurality of circular apertures each have a diameter larger than the diameter of the first plurality of apertures, hub bolts are adapted to be mounted on the disk shaped wheel mounting flange equidistantly along an outer periphery of the disk shaped wheel mounting flange, an inner raceway surface is formed on an outer circumferential surface opposite to one of the double row outer raceway surfaces and a cylindrical portion axially extends from the inner raceway surface, a shaft-shaped portion has an outer diameter larger than a diameter of a bottom of an inner side inner raceway surface, an outer outline configuration of the wheel hub continues from the bottom of the inner raceway surface to the cylindrical portion via a counter portion, the shaft shaped portion axially extending from the counter portion, a taper shaped stepped portion, and a shoulder, a substantially conical recess is formed in an outer side end portion of the wheel hub, and the depth of the recess extends into the wheel hub past the outer side inner raceway surface and the conical recess terminates at the outer side of a shoulder of the wheel hub against which an inner ring abuts so that a substantially constant wall thickness is formed between the conical recess and the outer circumferential surface of the wheel hub of the outer side end portion and the wheel hub is solid under the inner side inner raceway surface;
   an inner ring is press fit onto the cylindrical portion abutting the shoulder, the inner ring is formed, on its outer circumferential surface, with the inner side inner raceway surface opposite to the other raceway surface of the double row outer raceway surfaces;
   double row groups of balls are freely rollably contained between the outer raceway surfaces and the inner raceway surfaces, respectively, of the outer member and the inner members;
   a pitch circle diameter of an outer side ball group is larger than a pitch circle diameter of an inner side ball group; and
   ribs are formed on a surface of the inner side of the disk shaped wheel mounting flange and each rib includes at least one aperture of said plurality of first apertures, each rib is formed by an outline including straight portions, radially extending outwardly from the base of the disk shaped wheel mounting flange, and a rounded tip portion, having a predetermined radius of curvature centered on an axial center of a hub bolt and substantially corresponding to a distance between the axial center and the outermost periphery of the disk shaped wheel mounting flange, the ribs have a substantially constant thickness in a radial direction and at least one circular aperture of said second plurality of circular apertures is positioned in a portion of the mounting flange between adjacent ribs for enabling tool access and the portion of the mounting flange between adjacent ribs is tapered radially outward so that its thickness gradually reduces radially outward.

2. The vehicle wheel bearing apparatus of claim 1 wherein the radius of curvature of the rounded tip portion is set so that it is larger than a distance between the axial center of hub bolt and the straight portion and smaller than a distance between the axial center of hub bolt and a point of intersection of the outermost periphery of the disk shaped wheel mounting flange and a line extended radially outward from the straight portion.

3. The vehicle wheel bearing apparatus of claim 1 wherein the outer diameter of each ball is the same in the outer side ball group and the inner side ball group, and the number of balls of the outer side ball group is set larger than the number of balls of the inner side ball group.

4. The vehicle wheel bearing apparatus of claim 1 wherein a ratio of the outer diameter of each ball to the pitch circle diameter of the inner side ball group is set in a range of $0.14 \leq (d/PCDi) \leq 0.25$.

5. A vehicle wheel bearing apparatus comprising:
   an outer member formed with a body mounting flange on its outer circumferential surface, said body mounting flange adapted to be mounted on an automobile knuckle, and said outer member formed with double row outer raceway surfaces on its inner circumferential surface;
   an inner member formed, on its outer circumferential surface, with double row inner raceway surfaces, respectively, opposite to the other raceway surface and a wheel mounting flange integrally formed at one end continuously about a periphery of the inner member, a wheel hub has a shaft-shaped portion with an outer diameter larger than a diameter of a bottom of an inner side inner raceway surface, an outer outline configuration of the wheel hub continues from the bottom of the inner raceway surface to a cylindrical portion via a counter portion, the shaft shaped portion axially extending from the counter portion, a taper shaped stepped portion, and a shoulder, a substantially conical recess is formed in an outer side end portion of the wheel hub, and the depth of the recess extends into the wheel hub past the outer side inner raceway surface and the conical recess terminates at the outer side of the shoulder of the wheel hub against which an inner ring abuts so that a substantially constant wall thickness is formed between the conical recess and the outer circumferential surface of the wheel hub of the outer side end portion and the wheel hub is solid under the inner side inner raceway surface, a first plurality of apertures and a second plurality of circular apertures formed in the flange, the second plurality of circular apertures each have a diameter larger than the diameter of the first plurality of apertures;

ribs are formed on a surface of the inner side of the wheel mounting flange and each rib includes at least one aperture from said first plurality of apertures, each rib is formed by an outline including straight portions, radially extending outwardly from the base of the wheel mounting flange, and a rounded tip portion, having a predetermined radius of curvature centered on an axial center of a hub bolt and substantially corresponding to a distance between the axial center and the outermost periphery of the wheel mounting flange, the ribs have a substantially constant thickness in a radial direction and at least one circular aperture of said second plurality of circular apertures is positioned in a portion of the mounting flange between adjacent ribs for enabling tool access direction and the portion of the mounting flange between adjacent ribs is tapered radially outward so that its thickness gradually reduces radially outward;

double row groups of balls are freely rollably contained between the outer raceway surfaces and the inner raceway surfaces, respectively, of the outer member and the inner members;

the body mounting flange formed with four apertures to receive bolts to fasten to a knuckle, said body mounting flange also formed with recesses, each having a curved configuration on its outermost periphery between the bolt apertures;

a pitch circle diameter of an outer side ball group is larger than a pitch circle diameter of an inner side ball group; and a pitch of bolt apertures in a loading direction is larger than a pitch of bolt apertures in a direction orthogonal to the loading direction.

6. The vehicle wheel bearing apparatus of claim 5 wherein the outer diameter of each ball is the same in the outer side ball group and the inner side ball group, and the number of balls of the outer side ball group is set larger than the number of balls of the inner side ball group.

7. The vehicle wheel bearing apparatus of claim 5 wherein a ratio of the outer diameter of each ball to the pitch circle diameter of the inner side ball group is set in a range of $0.14 \leqq (d/PCDi) \leqq 0.25$.

* * * * *